United States Patent
Wang

(10) Patent No.: US 8,548,920 B2
(45) Date of Patent: Oct. 1, 2013

(54) SYSTEM AND METHOD OF AUTHENTICATION, MONITORING, AND ADVERTISEMENT DISTRIBUTION

(76) Inventor: Ping Wang, Hicksville, NY (US)

( * ) Notice: Subject to any disclaimer, the term of this patent is extended or adjusted under 35 U.S.C. 154(b) by 211 days.

(21) Appl. No.: 13/011,017

(22) Filed: Jan. 21, 2011

(65) Prior Publication Data

US 2011/0184791 A1   Jul. 28, 2011

Related U.S. Application Data

(60) Provisional application No. 61/298,170, filed on Jan. 25, 2010.

(51) Int. Cl.
*G06F 21/00* (2013.01)
*G06F 17/00* (2006.01)

(52) U.S. Cl.
USPC ............................................. 705/59; 700/94

(58) Field of Classification Search
USPC ........................................ 705/58, 59; 700/94
See application file for complete search history.

(56) References Cited

U.S. PATENT DOCUMENTS

| | | | |
|---|---|---|---|
| 5,765,152 A | 6/1998 | Erickson | |
| 6,807,534 B1 | 10/2004 | Erickson | |
| 7,047,241 B1 | 5/2006 | Erickson | |
| 7,398,556 B2 | 7/2008 | Erickson | |
| 7,565,327 B2 | 7/2009 | Schmelzer | |
| 7,647,642 B2 | 1/2010 | Erickson | |
| 7,707,088 B2 | 4/2010 | Schmelzer | |
| 7,711,652 B2 | 5/2010 | Schmelzer | |
| 2004/0172365 A1 | 9/2004 | Murakami et al. | |
| 2007/0156594 A1 | 7/2007 | McGucken | |
| 2007/0256137 A1 | 11/2007 | Tame | |
| 2007/0288107 A1* | 12/2007 | Fernandez-Ivern et al. | 700/91 |
| 2009/0177519 A1* | 7/2009 | Tota et al. | 705/10 |
| 2009/0265343 A1 | 10/2009 | McFarland et al. | |
| 2009/0313226 A1 | 12/2009 | Bennett | |
| 2009/0313249 A1 | 12/2009 | Bennett | |
| 2009/0316894 A1 | 12/2009 | Li | |
| 2010/0042652 A1 | 2/2010 | O'Donnell | |
| 2010/0185306 A1* | 7/2010 | Rhoads | 700/94 |
| 2010/0226525 A1* | 9/2010 | Levy et al. | 382/100 |

* cited by examiner

*Primary Examiner* — Charles C Agwumezie
(74) *Attorney, Agent, or Firm* — Schmeiser, Olsen & Watts, LLP

(57) ABSTRACT

A method including receiving, by a processor of a computing system, a submission from a user, authenticating, by the processor, the submission received from the user with a unique identifier of the submission, tracking, by the processor, the unique identifier to detect a presence of the submission, determining, by the processor, whether the presence is authorized, and distributing, by the processor, a portion of proceeds to the user if the presence is authorized is provided. Furthermore, an associated computer program product and computer system is also provided.

23 Claims, 7 Drawing Sheets

SYSTEM AND METHOD OF AUTHENTICATION, MONITORING, AND ADVERTISEMENT DISTRIBUTION

CROSS-REFERENCE TO RELATED APPLICATIONS

This application claims priority to U.S. Provisional Application No. 61/298,170, filed Jan. 25, 2010, entitled "Search Engine That Recognize Content Origins."

FIELD OF TECHNOLOGY

The following relates to an authenticating, monitoring, tracking, and advertisement distribution system and method, and more specifically to embodiments of a system and method of authenticating, monitoring, tracking, and advertisement distribution.

BACKGROUND

The Internet contains a vast amount of copyrighted content, accessible by anyone connected to the Internet. The creative content or works of authorship posted to a website is generally the reason people decide to initially visit and return to the website. As more people visit the website displaying copyrighted content, the desire to advertise on that website increases. Typically, a search engine, or other advertising company system, is paid by advertisers to place advertisements on the websites with sustained activity; advertisements placed on those websites create revenue for the website, the search engine, and the advertisement company. Copyrighted content is often times unlawfully republished and posted onto those websites collecting revenue from the placement of advertisements. Websites unlawfully posting copyrighted contents and search engine presenting advertisements on the pages containing unlawfully posted copyrighted contents rarely compensate the original author of the copyrighted content, and share no affiliation or revenues with the author. However, advertisements including those based on the content of the copyrighted work, will be placed on the website, generating revenue only for the website and the advertisement company. Thus, the benefactors in these situations include only the website unlawfully posting the copyrighted content and the online advertising company placing the advertisements.

Thus, a need exists for an apparatus and method for authenticating authorship and monitoring and tracking presence of copyrighted content over the network, and distributing proceeds from online advertisements to include an author or owner of copyrighted content.

SUMMARY

A first general aspect relates to a method comprising receiving, by a processor of a computing system, a submission from a user, authenticating, by the processor, the submission received from the user, with a unique identifier of the submission, tracking, by the processor, the unique identifier to detect a presence of the submission, determining, by the processor, whether the presence is authorized, and distributing, by the processor, a portion of proceeds to the user.

A second general aspect relates to a computer program product, comprising a computer readable storage medium having a computer readable program code embodied therein, said computer readable program code comprising an algorithm that when executed by a computer processor of a computing system implements a method comprising receiving, by a processor of a computing system, a submission from a user, authenticating, by the processor, the submission received from the user, with a unique identifier of the submission, tracking, by the processor, the unique identifier to detect a presence of the submission, determining, by the processor, whether the presence is authorized, and distributing, by the processor, a portion of proceeds to the user.

A third general aspect relates to a computing system comprising a computer processor coupled to a computer-readable storage device, said storage device containing instructions that when executed by the processor implement a monitoring and distribution method comprising receiving, by a processor of a computing system, a submission from a user, authenticating, by the processor, the submission received from the user, with a unique identifier of the submission, tracking, by the processor, the unique identifier to detect a presence of the submission, determining, by the processor, whether the presence is authorized, and distributing, by the processor, a portion of proceeds to the user.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
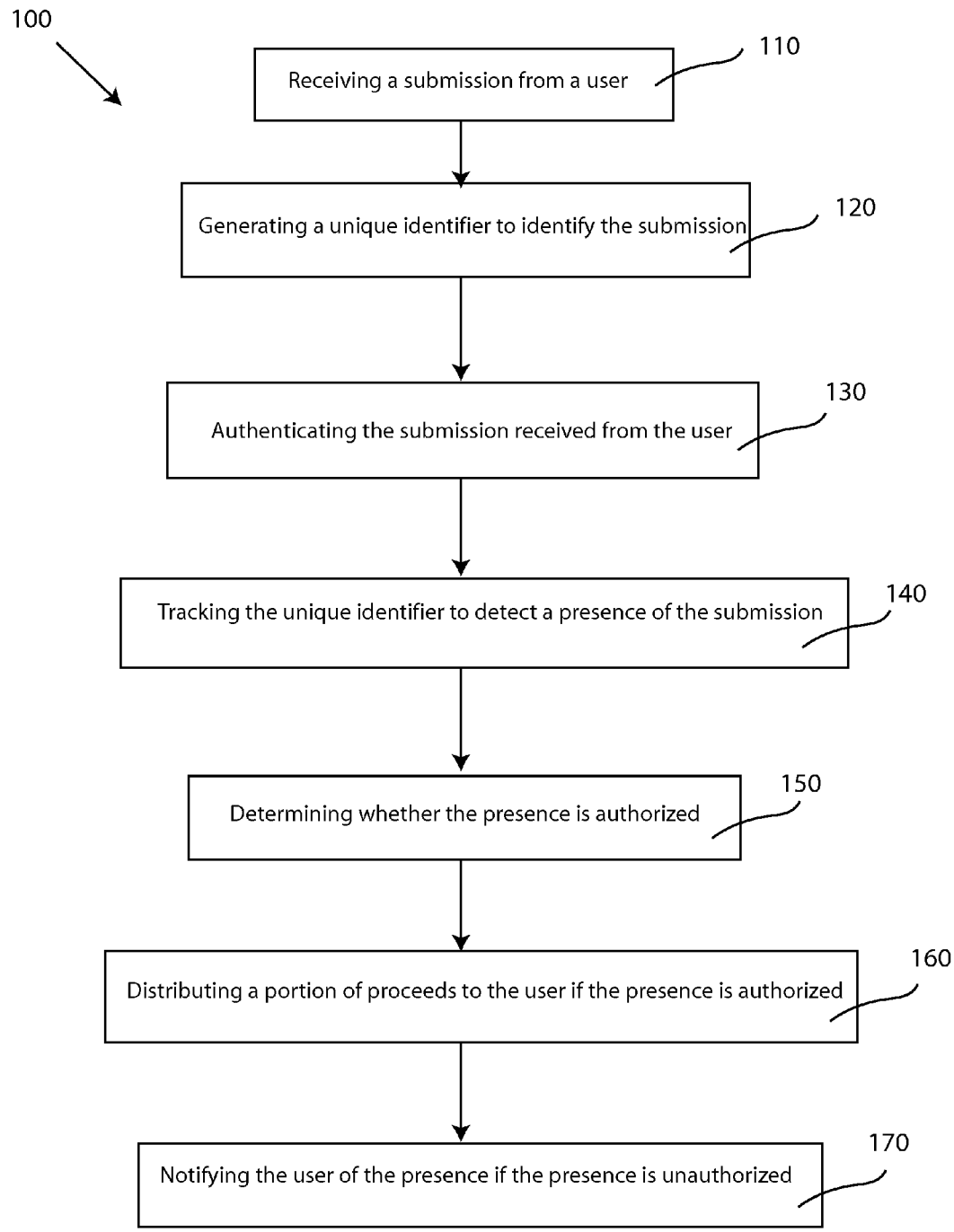
FIG. 1 depicts a flowchart of an embodiment of an online authenticating, tracking, monitoring and distribution method.

Referring to the drawings, FIG. 1 depicts an embodiment of an online advertisement distribution and monitoring method 100. Embodiments of method 100 may include receiving a submission from a user 110, generating a unique identifier 120, authenticating the submission received from the user 130, tracking the unique identifier to detect a presence of the submission over a network 140, determining whether the presence is authorized 150, distributing a portion of advertisement proceeds to the user if the presence is authorized 160, and notifying the user if the presence is unauthorized 170. For instance, a computer program product, including a computer readable storage medium 14 having a computer readable program code 497 embodied therein, said computer readable program code 497 comprising an algorithm that when executed by a computer processor 491 of a computing system 10 may implement a monitoring and distribution method 100. Furthermore, a computing system including a computer processor 491 coupled to a computer-readable storage device 14, said storage device 14 containing instructions that when executed by the processor 491 may implement a monitoring and distribution method 100.

Figure 2:
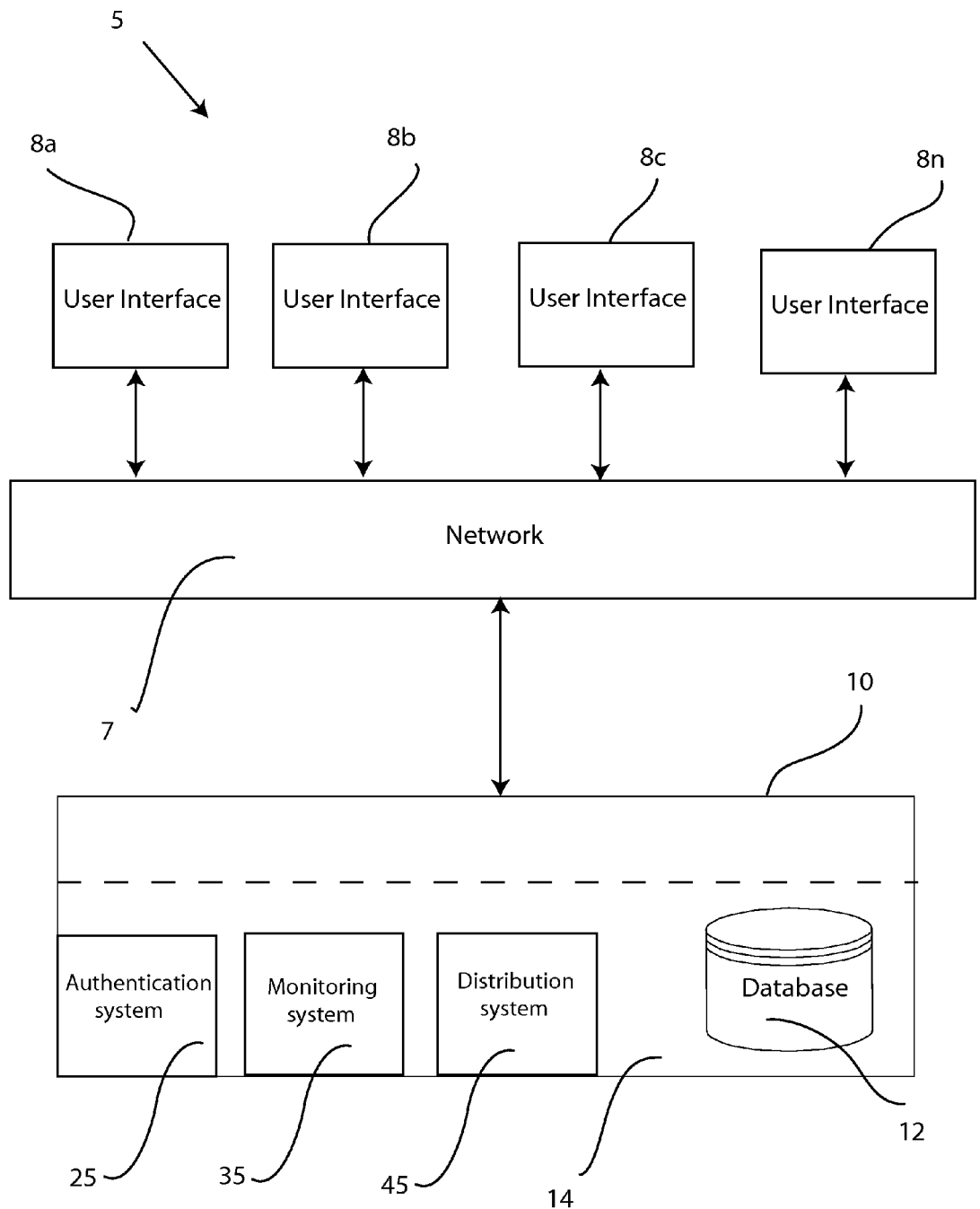
FIG. 2 depicts an embodiment of a system that is used with the online authenticating, tracking, monitoring and distribution method.

Referring to FIG. 2, an embodiment of system 5 may be used to implement an authenticating, monitoring, tracking, and advertisement distribution method 100. System 5 may receive a submission from a user. System 5 may generate a unique identifier to authenticate the submission and track a use or presence of the submission over the network; the unique identifier may also be stored on a database 12 of system 5. Once a unique identifier is generated for the submission, system 5 may then authenticate the submission (e.g. copyrightable work) received from the user to determine if the submission is original and whether the submission is found elsewhere over the network. Authentication may assist a determination whether the user is at least one of an author and an owner of the submission. If the submission is original, or the user is the author and/or the owner of the submission, system 5 may create a user account (or update a user account) and store information related to the user account, information associated with the user, and each submission onto a database 12. Moreover, if a use or presence of the submission is detected (e.g. a website posts the submission), system 5 may determine whether the use or presence is authorized. If the use or presence is authorized, system 5 may distribute, to the user's account, a portion of proceeds generated by the placement of advertisements on the website, wherein the distribution portion is in accordance with a pre-determined, pre-existing, or newly created agreement between a user (e.g. copyright owner), a website, and a search engine's online advertisement system, wherein the advertisement system may be executed by the processor 491 of computing system 10. If the use or presence of the submission is unauthorized, system 5 may continue to track and monitor the usage, notify the user of the unauthorized use or presence of advertisement on the submission page, and potentially proceed with legal action towards the infringing party.

System 5 may comprise user interfaces 8a . . . 8n connected through a network 7 to a computing system 10, wherein the computing system 10 includes an authentication system 25, a monitoring system 35, and a distribution system 45. Network 7 may comprise any type of network including, inter alia, a telephone network, a cellular telephone network, a local area network, (LAN), a wide area network (WAN), the Internet, etc. User interfaces 8a . . . 8n may comprise any type of devices capable of implementing a network (e.g. social network) including, inter alia, a telephone, a cellular telephone, a digital assistant (PDA), a smart phone, a video game system, an audio/video player, a personal computer, a laptop computer, a desktop computer, a computer terminal, etc. Each of user interfaces 8a . . . 8n may comprise a single device or a plurality of devices. User interfaces 8a . . . 8n are used by end users for communicating with each other and computing system 10. For example, users may use the user interfaces 8a . . . 8n to submit a copyrightable work by communication with a processor 491. Additionally, users may input data, such as information regarding a submission, user account information, payment plans, customized instructions, and other data associated with the method 100. Computing system 10 may comprise any type of computing system(s) including, inter alia, a personal computer (PC), a server computer, a database computer, etc. Computing system 10 may be executing a search engine and/or an affiliated advertisement system. For example, a processor 491 of the computing system 10 may be executing software performing steps associated with method 100. Moreover, computing system 10 may be used to monitor and track a submission over network 7, such as a use or presence of a copyrightable article on various websites/WebPages. Computing system 10 may comprise a memory system 14. Memory system 14, or computer readable storage device, may comprise a single memory system. Alternatively, memory system 14 may comprise a plurality of memory systems. Memory system 14 may also comprise a software application and a database 12. Database 12 may include all retrieved and calculated data associated with authenticating, monitoring, tracking, distributing, and other the steps associated with method 100. Database 12 may be internal to the computing system 10 and/or memory device 14 as depicted in FIG. 2. Alternatively, database 12 may be external to the computing system 10. Moreover, the authentication system 25, the monitoring system 35, and the distribution system 45 may be internal or external to the computing system 10. In one embodiment, the authentication system 25, the monitoring system 35, and the distribution system 45 may be modules in a software application that can enable a monitoring and distribution method 100. In another embodiment, the authentication system 25, the monitoring system 35, and the distribution system 45 may be independent software applications or part of the same software application that can enable a monitoring and distribution method 100. In yet another embodiment, the authentication system 25, the monitoring system 35, and the distribution system 45 may each have its own processor in a computing system 10, or may be part of the computing system 10, as shown in FIG. 2.

Referring back to FIG. 1, embodiments of method 100 may include the step of receiving a submission from a user 110. A submission may refer to a copyrightable work that a user can submit, upload, transfer, share, email, electronically send, etc., to an authentication system 25 of computing system 10 through operation of at least one user interface 8a . . . 8n. In other words, a processor 491 executing the authentication system 25 may receive a submission from a user interface 8a through data entered/inputted by the user. For instance, the processor 491 may receive an audio/visual file (e.g. song) or word document (e.g. news article) from the user interface(s) 8a . . . 8n. The submission may be stored on a database 12 of computing system 10 or storage device 14 of computing system 10. The submission may also be immediately published to a particular website/webpage while undergoing authentication procedures described in further detail infra. The submission, or copyrightable work, may be an unregistered work, a registered, copyrighted work, a literary work, a musical work, a dramatic work, a pictorial work, a graphic work, a motion picture, an audio visual file, a sound recording, an article, a text-based work, a derivative work, a compilation, and/or a digital image. Furthermore, a user may be a person (e.g. author) or entity (e.g. corporation, small business, etc.) that intends to, or is capable of, publishing, posting, displaying, copying, distributing, submitting, etc. a copyrightable work over/on a network 7, such as the Internet. In many embodiments, the user submitting the copyrightable work is at least one of the author of the work or the owner of the work; the user may also be the author and the owner of the submission.

The submission may be received by a processor executing an authentication system 25, (i.e. a processor 491 of computing system 10) from the user through various methods. Embodiments of method 100 may include receiving an automatic submission through a browser, such as a search engine browser, or browser add-on, wherein the search engine may be executed by the computing system 10. Further embodiments of method 100 may include receiving a submission's initial publication Uniform Resource Locator (URL). For instance, a user may submit an article's initial publication URL to authentication system 25, in accordance with method 100. Further embodiments of method 100 may include receiving a submission through a periodical robot scan. In particular, a search engine's robot(s), such as a search engine being executed by computing system 10, may crawl and index a new or updated submission. Even further embodiments of method 100 may include receiving one or more submissions through a batch submission portal. A batch submission portal may be beneficial to organizations, such as news agencies, because they allow a larger number of submissions. Those skilled in the art should appreciate that a submission may be received through a manual submission by a user, as well as other methods for transferring files, information, etc.

Referring still to FIG. 1, embodiments of method 100 may include the step of generating a unique identifier 120 for the submission. A unique identifier may be generated by a processor 491 executing the authentication system 25 after the submission has been received by processor 491 executing the authentication system 25. The unique identifier may refer to a unique expression, pattern, and/or code usually derived from a submission that may distinguish that submission, or copyrightable work, from another. Thus, authentication system 25 of computing system 10 may be able to distinguish, locate, detect, etc., a submission based on its unique identifier. The unique identifier may involve metadata (i.e. data about data) to identify and distinguish a submission. For instance, the unique identifier may be generated by extracting and/or combining portions of the submission using certain, consistent algorithms. Embodiments of a unique identifier may include one or more lines of text taken from a submitted article, or audio/video streams of an audio/visual submission. Further embodiments of generating a unique identifier 120 for a submission may involve creating a digital fingerprint. A digital fingerprint may also allow the authentication system 25 of computing system 10 to detect a submission over a network 7 by analyzing a digital fingerprint. Thus, each submission may be distinguished from the other works publicly posted/available on the Internet based on the unique identifier. Those having skill in the requisite art should appreciate that various methodologies and technologies may be used to generate a unique identifier, such as watermarking, content based identification (CBID), various forms of fingerprinting, and related techniques to render a file or submitted copyrightable work detectable and distinguishable. Further embodiments of generating a unique identifier may include recording a time stamp when the submission was received by the processor 491 executing the authentication system 25. A time stamp may assist the authentication system 25 in determining authorship of the submission. Alternatively, a unique identifier may already have been created and stored on an external database, or a central database controlled by a third party. For example, if the submission is a digital music file, a unique identifier may have already been created and such identifier may be stored on a central databases. Thus, authentication system 25 may simply search an external and/or central database to determine authorship.

Figure 3:
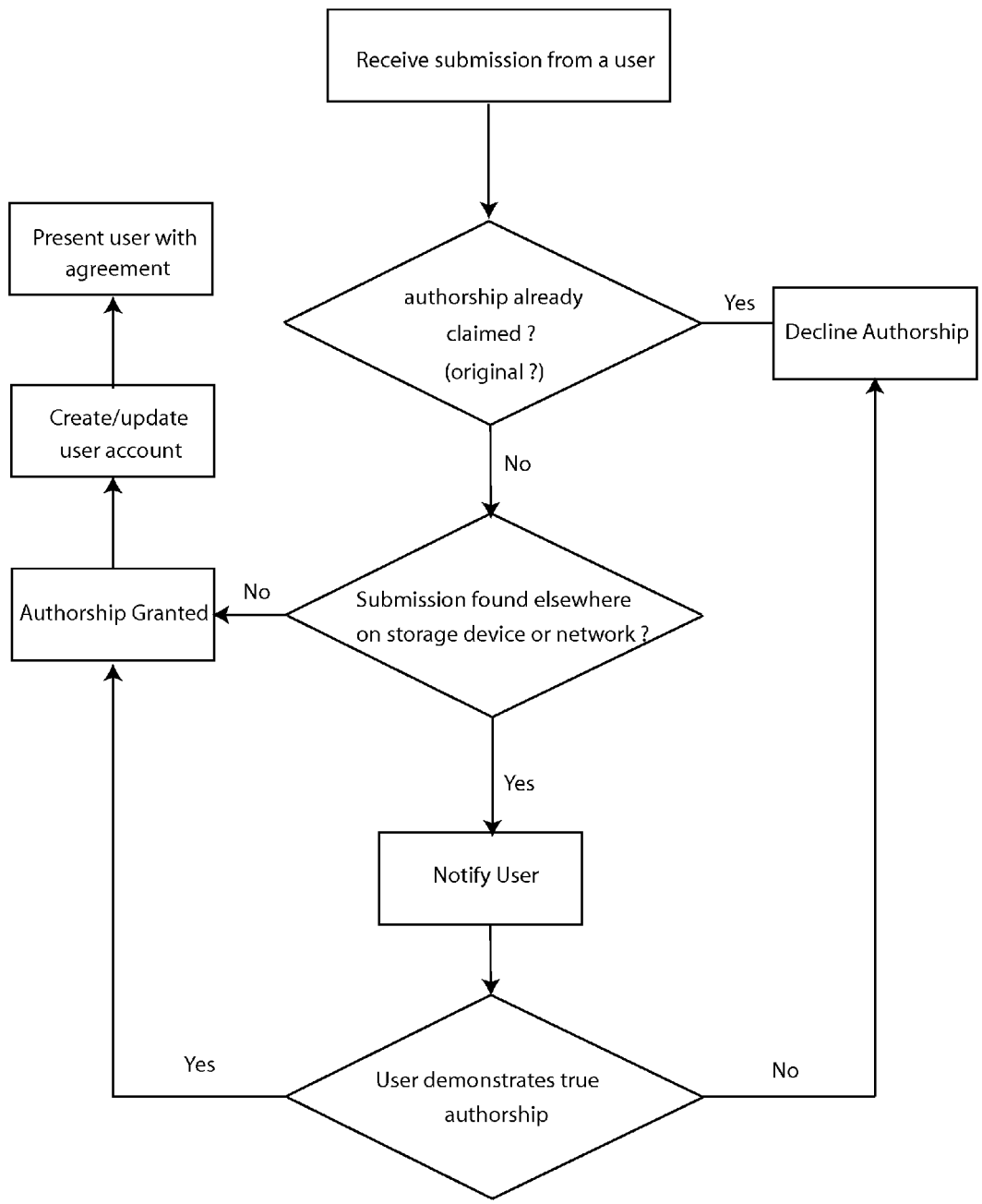
FIG. 3 depicts an embodiment of an authentication system receiving a submission.

Referring still to FIG. 1, and with additional reference to FIG. 3, embodiments of method 100 may include authenticating the submission received by the user 130. Once a unique identifier is generated for the submission, the submission may be authenticated to determine if the submission is original and/or whether the submission is found elsewhere over a network, such as network 7. For example, a processor 491 of computing system 10 executing an authentication system 25 may determine whether the unique identifier generated for a specific submission already exists over the network 7, in a storage device 14 and/or a database 12 (e.g. a database of a search engine executed by the computing system 10). Authentication may be performed via automatic verification on a background if a single search engine's browser or browser add-on applications are used for publishing/submitting the submission (e.g. search engine being executed by computing system 10 performing steps associated with method 100). If the unique identifier already exists in a storage device 14 or database 12, then the submission may not be authenticated. In other words, authentication system 25 may decline or deny a claim for authorship or ownership by a user, wherein the claim was made contemporaneous with or after submitting a copyrightable work to the authentication system 25, and a user account may not be created or updated. Moreover, if the submission is already available over the network 7 (e.g. the Internet), the authentication system 25 may decline the claim for ownership and not authenticate the submission. However, some embodiments of method 100 may allow the user to provide additional documentation, execute further agreements, and produce legal affidavits to demonstrate that the user is the true author/owner of the submission which may already be available over the network 7. If the unique identifier does not exist, for example, the authentication system 25 does not detect a presence of a duplicate submission or a presence of the unique identifier in the storage device 14, database 12, or over a network 7, the authentication system 25, in accordance with method 100, may consider the user to be the author and/or owner of the submission, and may indicate that the submission is original. Thus, authorship may be granted to the user, and a user's account may be created, or the user's account updated, by storing the submission (or simply the unique identifier of the submission) on a storage device 14 and/or database 12 of computing system 10 and indicating that the user is the author of the submission. Each user's submission received by the authentication system 25 and ultimately authenticated may be reflected in the user's account, and stored on the storage device 14 and/or database 12.

Embodiments of method 100 may also include tracking the unique identifier to detect a presence of the submission over a network 140. Tracking the unique identifier may include tracking, searching, monitoring, locating, browsing, indexing, crawling, etc., a network 7 or a storage device 14 and/or database 12 of computing system 10 for a submission or the unique identifier of a particular submission. A processor 491 executing a monitoring system 35 may monitor and track a presence of the unique identifier over a network 7 or, potentially, a presence in the computer readable storage device. A presence of the unique identifier may refer to a submission (or the unique identifier of the submission) being used, displayed, posted, pasted, indexed, shown, revealed, available, shared, presented, clickable, downloadable, accessible, and the like, over/on the network 7, such as on a webpage, website, a hyperlink, a flash player, a web crawler, a web browser, and the like. For example, a presence of a submission (or unique identifier of the submission) may include a website displaying a user's submission. Another example of a presence of a submission over a network 7 may include indexing a user's submission in the result page of a search engine or other search tool. Another example of a presence of a submission over a network 7 may be an audio/visual file available and/or playable on a website. A submission may be tracked and monitored by the monitoring system 35 implementing computer algorithms designed to detect duplicates across the network 7. In one embodiment, monitoring system 35 may use/implement a shingling algorithm to detect a duplicate unique identifier over the network 7. In another embodiment, monitoring system 35 may use/implement a simhash algorithm to detect a duplicate unique identifier over the network 7. Those skilled in the art should appreciate that other adequate algorithms, software, and software modules may be used in conjunction with the monitoring system 35 to track and monitor a unique identifier (or a submission). Moreover, the processor 491 executing the monitoring system 35 may record and examine the time stamp generated by the authentication system 25 of computing system 10 when the submission was received by the processor 491 executing the authentication system 25 from the user.

Figure 4:
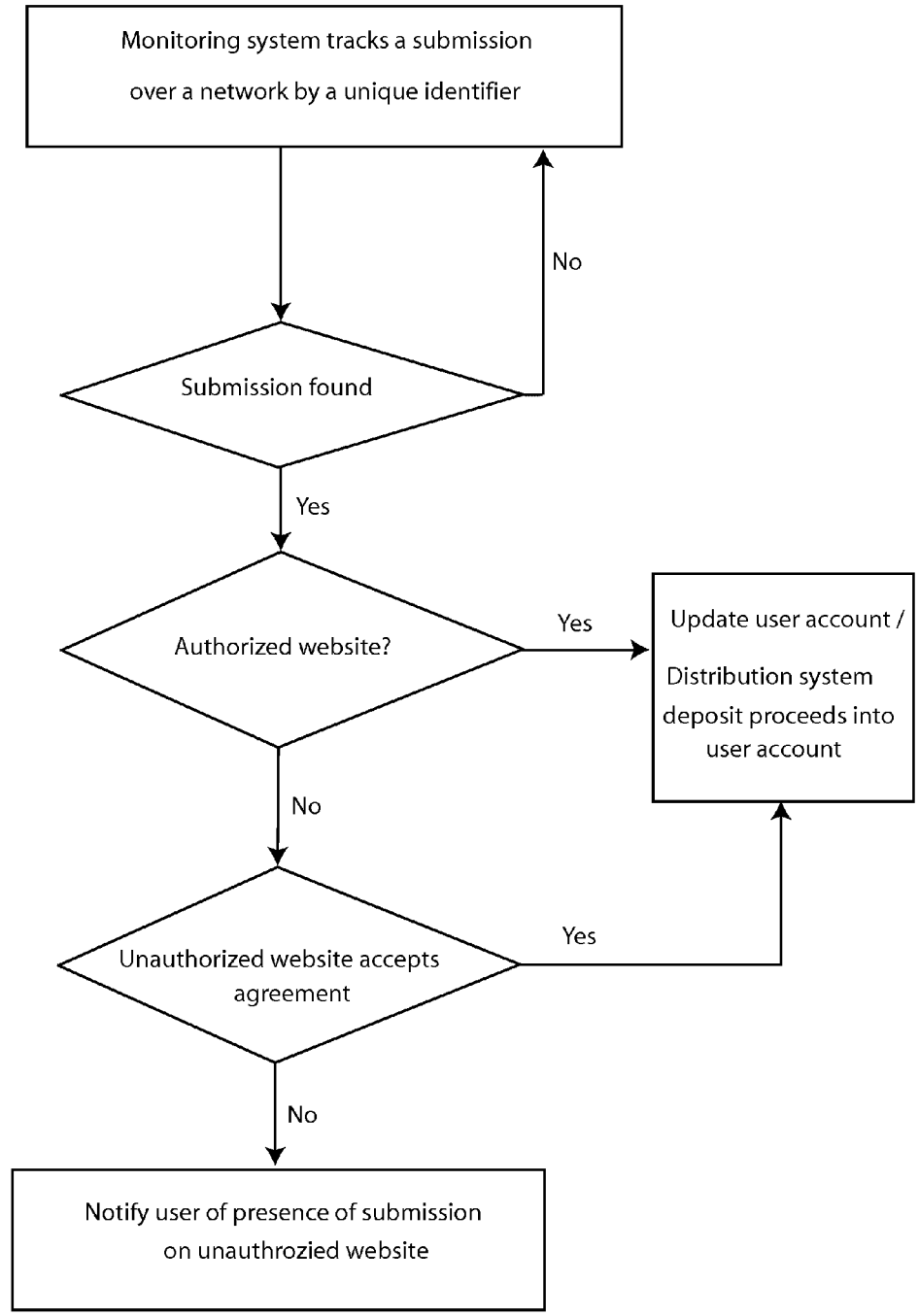
FIG. 4 depicts a flowchart of an embodiment of a monitoring system tracking a submission over a network.

Referring now to FIG. 4, embodiments of method 100 may include detecting a presence of a submission over a network 140. For instance, a processor 491 executing the monitoring system 35 of computing system 10 may detect a presence of a submission over a network if the unique identifier is found somewhere on the network 7. If the monitoring system 35 locates, discovers, finds, etc., a submission or a unique identifier of a submission over the network 7, or on a storage device 14 or database 12, the monitoring system 35 may determine whether the website, or other location within the network 7, includes at least one advertisement. An advertisement may be any notice, text, logo, trademark, clip, and the like, designed to promote, raise awareness, market, sell, etc., a good, service, organization, cause, political party, etc. In many embodiments, online advertisements may be content-based or static. Content based advertisements may be strategically placed by a search engine and its affiliated advertisement system depending on several factors, including the content of the website, which generally matches or is in some way related to the content of the advertisements. Static advertisement may be banners, logos, and the like, placed on the website pursuant to an agreement between the website and an advertiser. If no advertisements are detected, the monitoring system 35 may continue tracking and monitoring the use/presence/activity of the submission and may notify the user of the presence/use/activity, which can be unlawful. In addition, the monitoring system 35 may take steps, legal or otherwise, on behalf of the user to remove or facilitate, demand, require, etc., removal of the submission, or obtain compensation, such as a royalty or settlement, from the website or its owners, for continued presence of the submission.

Furthermore, if the monitoring system 35 locates, discovers, finds, etc., a submission or a unique identifier of a submission over the network 7, or on a storage device 14 or database 12, the monitoring system 35 may determine whether the website, or other location within the network 7, is authorized. The step of determining authorization of the website may occur after an advertisement is detected on the website or similar pages/links associated with the submission, or may be completed without first detecting, or detecting at all, an advertisement on the website. Authorization may be based on a user provided license or assignment of an exclusive right of a copyright owner (e.g. the right to publicly perform, distribute, copy, etc., the submission). Authorization may be provided by the user in more than one method; thus, the monitoring system 35 may determine authorization in more than one method. Embodiments of method 100 may include determining authorization prior to detection of a presence of a submission over the network 7. For instance, the user may authorize a website, or other location within a network 7, by identifying a particular website(s) and webpage(s) that may display, copy, distribute, publish, post, etc., a user's submission, and provide authorization, such as an assignment or license, and may provide authorization before any distribution of proceeds or other actions are taken by the computing system 10. In one example, a user may submit his article to the authentication system 25 of computing system 10 with instructions that a non-profit organization's website may host, publish, post, etc., the article being submitted. However, the user may require, at the time of authorizing a website to post the user's submission, that the website enter into an agreement, as described infra, which guarantees a division of revenue generated by advertisement system executed by computing system 10 of the present application, and potentially a division of revenue generated by an online advertisement placed by other advertisement company.

Other embodiments of method 100 may include determining authorization prior to or at the point of detecting a presence of a submission. Accordingly, authorization may be based on a participation in a pre-existing agreement, or an acceptance of terms of an agreement presented at some point to a website or other third party. Once a submission, or its unique identifier, is found over the network 7, for example, on a specific website, the monitoring system 35 may determine whether the specific website or content based online advertising agency (i.e. as an entity or its operators or owner(s)) are part of the agreement which requires a division of revenue generated by content-based advertisements, such as those which are placed on websites with relevant content, or static advertisements located on the specific website. If the website is a party to, or is bound by the agreement, monitoring system 35 may determine/conclude that the website is authorized and then may update the user's account and notify the user of the use or presence of the user's submission on a particular website. Once the monitoring system 35 determines that a presence is authorized (e.g. a website posting the submission is authorized), a distribution system 45 of computing system 10 may distribute and/or deposit a portion of the proceeds derived by an online advertisement placed by advertisement executed by the computing system 10 which is associated with the submission, in accordance with the terms of an agreement. However, a website, or other location over a network 7, may be authorized, but may also include advertisements placed by an advertiser or advertisement company which places ads that does not have an agreement with the user. The monitoring system 35 may determine authorization and the distribution system 45 may distribute proceeds based on the authorization for the detected advertisements placed by an advertisement system executed by the computing system 10, but the monitoring system 35 may also continue tracking and monitoring the use/presence/activity of the submission displayed on the website with the unauthorized advertisement and may notify the user of the presence/use/activity. In addition, the monitoring system 35 may take steps, legal or otherwise, on behalf of the user to remove or facilitate removal of the submission or advertisements placed by an advertiser or advertisement company that does not have an agreement with the user, or obtain compensation, such as a royalty or settlement, for continued presence of the submission.

Referring still to FIG. 4, further embodiments of method 100 may include determining authorization at the point of or subsequent to detecting a presence of a submission. Once a submission is found over the network 7, for example, on a specific website, the monitoring system 35 may determine that the specific website (i.e. as an entity or its operators or owner(s)) is not authorized because they are not part of the agreement which may require a division of revenue generated by the content based advertisements, static advertisements, or other online advertisements. If the website is not a party to the agreement, the processor 491 executing the monitoring system 25 may present the website and involved parties with an opportunity to participate in the agreement through various methods of electronic communication. In one embodiment, the monitoring system 35, upon discovering a presence or use of a user's submission on an unauthorized source, may send an email to the website (or its listed contacts) to seek participation in an agreement dividing portions of revenue by allowing the website to use or take advantage of advertisement system of computing system 10, executed by processor 491 of the computing system 10. In another embodiment, the monitoring system 35 may initiate a window or similar prompt with the possibility of accepting terms of the agreement to distribute online advertisement proceeds generated or from advertisement system of computing system 10. In yet another embodiment, the monitoring system 35 may request and/or require that the unauthorized website use a particular search engine and advertisement system executed by the computer system 10 performing the steps associated with method 100, which shares revenue according to an agreement, or face action for continued infringement. Those having skill in the art should appreciate that various methods of communication with a website over network 7 may be implemented to seek participation in the agreement, ultimately securing authorization to post a user's submission. In the event the website does not agree to the terms of the agreement, monitoring system 35 may notify the user of the presence of the submission on the unauthorized website and require the website to remove the submission.

Figure 5:
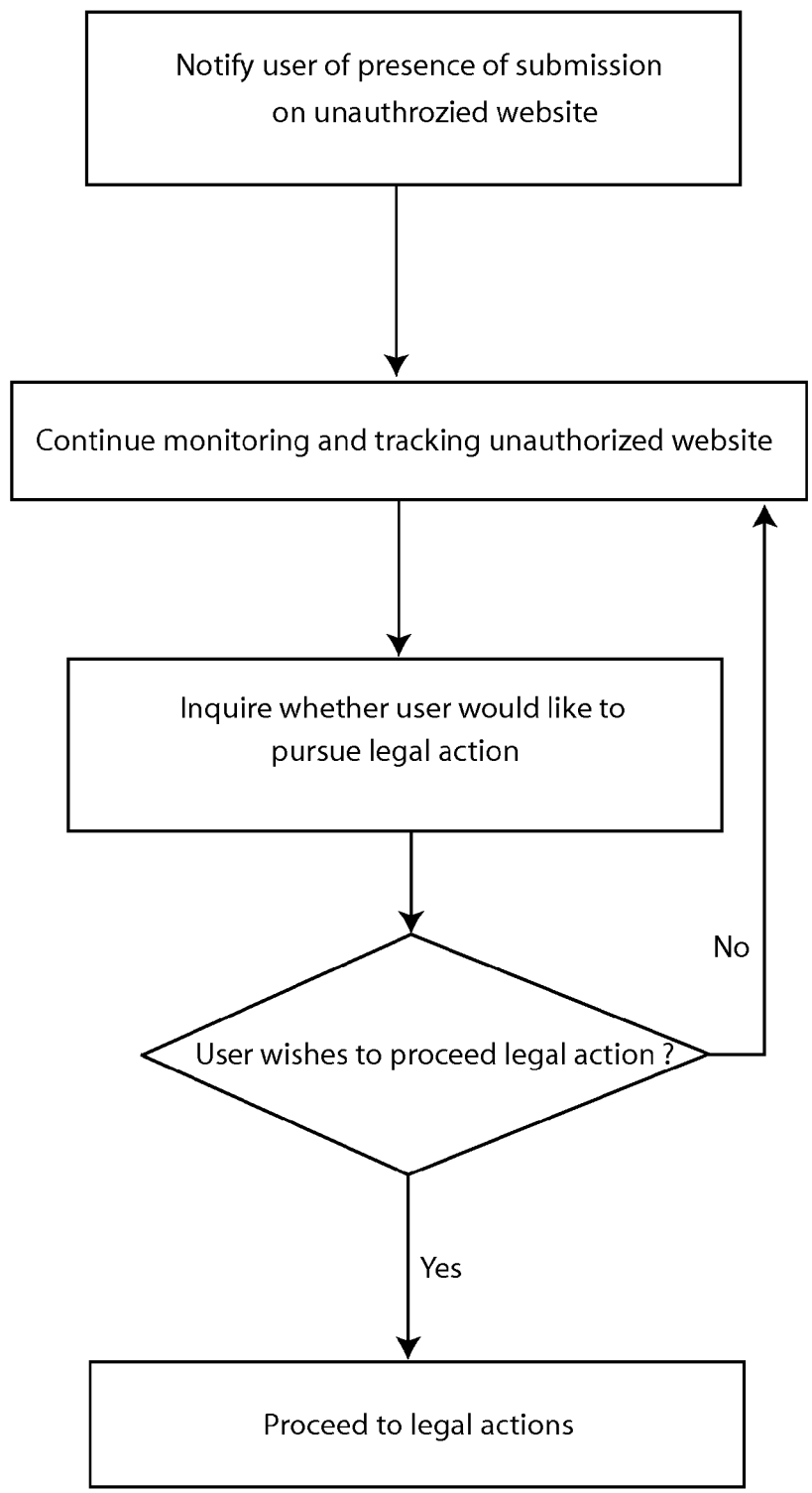
FIG. 5 depicts a flowchart of an embodiment of the monitoring system notifying a user of an unauthorized presence of a submission.

With reference now to FIG. 5, notifying, by the processor 491 executing the monitoring system 35, the user of unauthorized activity may include the ability to proceed with a legal course of action on behalf of the user. After, or contemporaneously with, notifying the user that the unauthorized website refuses to acquiesce to the agreement, or insists on continued infringement of a copyright owned by the user, the monitoring system 35 may continue monitoring, recording and/or tracking the activities of the unauthorized website, with respect to the user's submission. For example, monitoring system 35 may track and report the URL's of the unauthorized websites, monitor and report a situation where the same submission is being reprinted on other unauthorized websites or advertisements being placed on unauthorized reproductions of the same submission. If the unauthorized website does not voluntarily remove the user's submission, monitoring system 35 may determine whether the user would like to pursue a legal course of action. For example, using the information stored on the user's account or storage device 14 and/or database 12 of computing system 10, monitoring system 35 may generate a customized cease and desist letter upon receiving instructions from the user to pursue legal courses of action. The generated cease and desist letter may then be electronically communicated, sent, etc., to the unauthorized website over network 7, on behalf of the user. Alternatively, the monitoring system 35 may negotiate a settlement or some other form of compensation on behalf of user to be paid to the user (e.g. to user's account), or a portion thereof to the user to avoid further legal action. A settlement option may provide an opportunity for the website to maintain the publication of a submission immediately upon paying a settlement fee, which may be arranged and transacted almost immediately, potentially depending on user instructions. As the law permits, other suitable legal actions may be pursued by the monitoring system 35 on behalf of the user.

Figure 6:
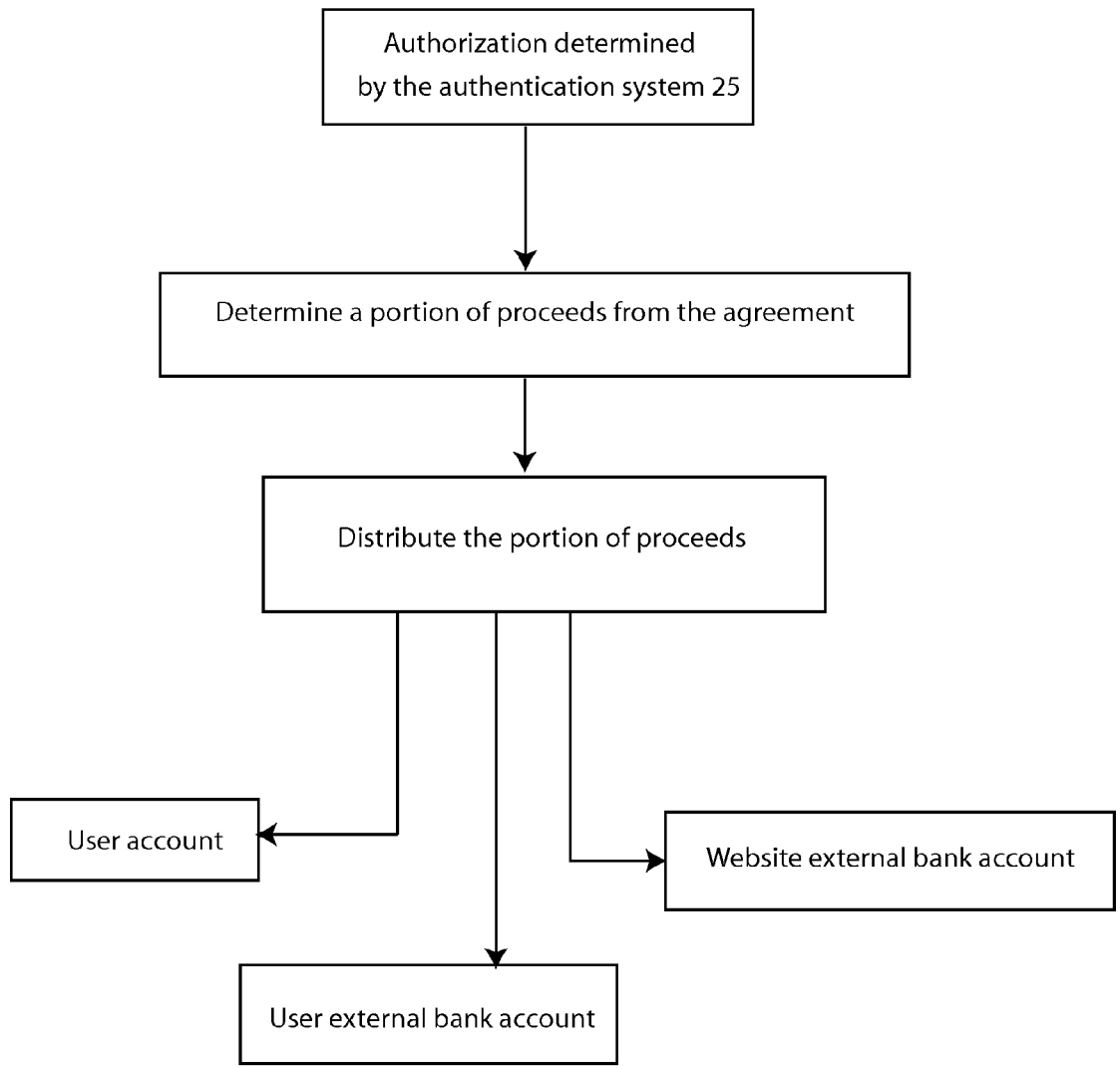
FIG. 6 depicts a flowchart of an embodiment of a distribution system distributing proceeds in accordance with an agreement.

Referring now to FIG. 6, embodiments of method 100 may include distributing, by the processor 491 executing the distribution system 45, a portion of proceeds to the user if a presence of a submission is authorized. Distribution system 45 of computing system 10 may distribute proceeds from revenue generated by online advertisements placed by advertisement system of computing system 10 (e.g. an advertisement system and/or a search engine executed by computing system 10). If proper authorization is determined by the monitoring system 35 upon a detection of a use or presence of a user's submission by an authorized entity, the distribution system 45 may automatically deposit a portion of the proceeds generated by online advertisements placed by advertisement system of computing system 10 into a user account associated with the submission present on the authorized website. Proceeds may refer to profit, return, income, revenue, and the like, derived from any transaction involving the placement of an online advertisement by advertisement system of computing system 10. The portion of the proceeds, or revenue, may be governed by an agreement between participating websites, advertisement system executed by the processor 491 of computing system 10, and authors/content creators. The terms of the agreement may infinitely vary depending on the parties involved; however, the agreement should at least include a provision wherein a percentage or portion of the proceeds is given to the author/copyright owner (user as described herein). Further embodiments of method 100 may include establishing a profit-sharing portal(s), linking various forms of media, etc. For example, profit-sharing portals may include news, blogs, forums, original literature works, and the like.

The distribution system 45 may distribute, deposit, allocate, dispense, issue, deliver, disperse, etc., funds, points, payment, value, currency, and the like, according to the terms of the agreement. Embodiments of the distribution system 45 may deposit funds into a user account according to an agreed percentage or portion which may go to the copyright owner and/or author. The user account may function as an internal bank account, or virtual wallet, that may collect and store an accumulated currency. Other embodiments of the distribution system 45 may deposit funds into an external bank account owned by the user using known techniques such as utilizing an account number and routing number of the user's bank account affiliated with an external bank or similar financial institution. Further embodiments of the distribution system 45 include collecting and storing payment information on a storage device 14 or a database 12 of computing system 10 to track and record payment information to the user and/or website.

The user may enter the agreement, which may also be a subscription to a service implementing the steps of method 100, at any time. The user may be presented, by the processor 491 executing the authentication system 25, with an agreement or an opportunity to accept the terms of the agreement/subscription when an initial submission is received and authenticated by the authentication system 25 and a user account is created. However, the user may initially decline, and may again be prompted after each submission is received or after a certain number of submissions are received by the authentication system 25. Accepting the terms of the agreement (i.e. agreeing to be bound by the terms of the agreement) may be accomplished by a digital signature, a click wrap agreement, a password protected electronic sign and registration process execute by the user or his or her legal representatives, or a physical contract/document may be mailed or sent to the user and signed. The agreement may be a standard agreement allowing all websites to use the submission in exchange for a portion of the advertisement proceeds, or the user may enter or suggest terms and/or limitations in the agreement for each submission they provide to the authentication system 25. For example, the user may limit the use of a particular submission to certain types of websites such as websites operated by non-profit organizations, government departments, and education systems. Moreover, the user may limit the type of use of the submission, and the amount of submission to be published. By entering the agreement presented by the authentication system 25, the user, as an author and/or owner of a copyright may be compensated for their creativity. The creativity and content created by an author may very well be the reason a particular website has high activity. The high activity can lead to online advertisement revenue, which may be distributed by the distribution system 45 to the copyright owner in accordance with the agreement. Furthermore, the monitoring system 35 may notify copyright owners (e.g. users) of frequent copyright infringement, and may possibly obtain compensation for them for the infringement without needing to enter a court room by offering/presenting an agreement to the infringing person/entity.

Likewise, an unauthorized source, for instance a website, may enter the agreement at any time, including at the point of being warned of an unauthorized presence of a submission. Accepting the terms of the agreement (i.e. agreeing to be bound by the terms of the agreement) may be accomplished by a digital signature, a click wrap agreement, a password protected electronic sign and registration process executed by a website's authorized agent (i.e. someone who can legally act on behalf of the website) of the website, or a physical contract/document may be mailed or sent to the authorized or registered agent of the website and signed. Websites that participate in the distribution agreement can attract more content creators, authors, and copyright owners to submit work. For example, if a website participates in the agreement to distribute revenue generated by online advertisements, a higher quality of content creator may be attracted to the website, or a larger number of talented authors, artists, journalists, commentators, etc., may wish to submit work to that website. Thus, with the higher quality of work/content being presented on the website, more visitors, readers, consumers, etc. may visit and return to that website. Accordingly, advertisers and/or advertisement services may place advertisements on participating website, increasing the website's revenue.

Figure 7:
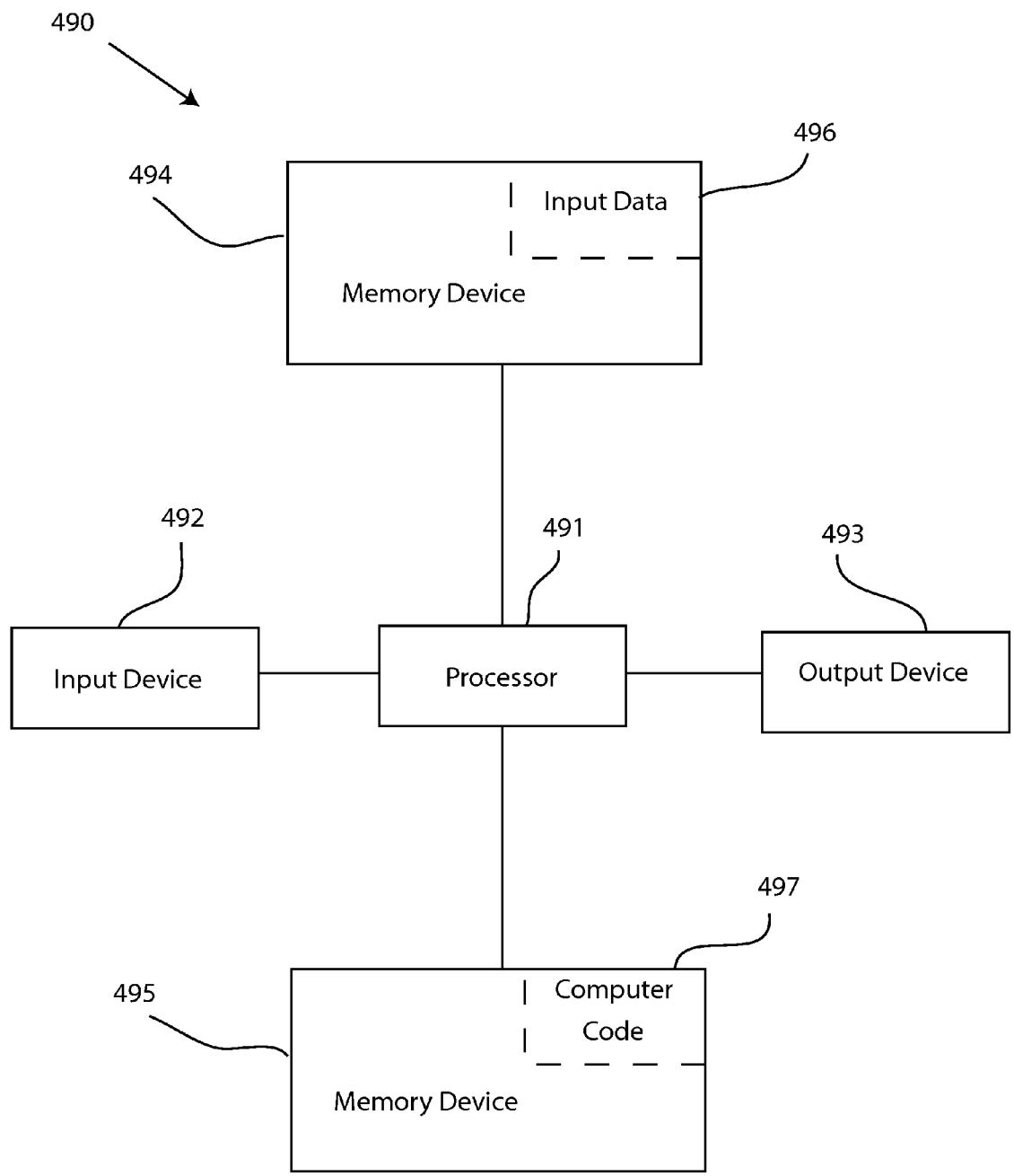
FIG. 7 depicts a schematic view of an embodiment of a computer system.

Referring now to FIG. 7, an embodiment of a computer apparatus 490, such as computing system 10 of FIG. 2 used for executing an authenticating, monitoring, tracking, and distribution system and method, is now described. The computer system 490 comprises a processor 491, an input device 492 coupled to the processor 491, an output device 493 coupled to the processor 491, and memory devices 494 and 495 each coupled to the processor 491. The processor 491 (of computing system 10) may execute the authentication system 25, monitoring system 35, and the distribution system 45. Moreover, the processor 491 may be a single processor executing the authentication system 25, monitoring system 35, and the distribution system 45, or may be more than independent processor executing the authentication system 25, monitoring system 35, and the distribution system 45. The input device 492 may be, inter alia, a keyboard, a software application, a mouse, etc. The output device 493 may be, inter alia, a printer, a plotter, a computer screen, a magnetic tape, a removable hard disk, a floppy disk, a software application, etc. The memory devices 494 and 495 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 495 includes a computer code 497. The computer code 497 includes algorithms or steps (e.g., the algorithms and/or steps of FIGS. 1-6) for an authenticating, monitoring, tracking, and distribution method 100. The processor 491 executes the computer code 497. The memory device 494 includes input data 496. The input data 496 includes input required by the computer code 497. The output device 493 displays output from the computer code 497. Either or both memory devices 494 and 495 (or one or more additional memory devices not shown in FIG. 7) may comprise the algorithms and/or steps of FIGS. 1-6 and may be used as a computer usable medium (or a computer readable medium or a program storage device) having a computer readable program code embodied therein and/or having other data stored therein, wherein the computer readable program code comprises the computer code 497. Generally, a computer program product (or, alternatively, an article of manufacture) of the computer system 490 may comprise the computer usable medium (or said program storage device). While FIG. 7 shows the computer system 490 as a particular configuration of hardware and software, any configuration of hardware and software, as would be known to a person of ordinary skill in the art, may be utilized for the purposes stated supra in conjunction with the particular computer system 490. For example, the memory devices 494 and 495 may be portions of a single memory device rather than separate memory devices. Therefore, computing system 10, including the authentication system 25, the monitoring system 35, and the distribution system 45, can enable a computer-implemented online advertisement distribution and monitoring method 100.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A method comprising:
 receiving, by a processor of a computing system, a submission from a user;
 authenticating, by the processor, the submission received from the user with a unique identifier of the submission;
 detecting, by the processor, a presence of the submission on a website, by tracking the unique identifier on a network;
 determining, by the processor, that the presence of the submission on the website is authorized;
 detecting, by the processor, a presence of one or more online advertisements on the website; and distributing, by the processor, a portion of proceeds based on the presence of the one or more online advertisements on the website into a user account associated with the submission that is present on the website.

2. The method of claim 1, wherein the user is at least one of the author, the owner of the submission, and a person claiming to be the owner of the submission who obtains proper authentication.

3. The method of claim 1, wherein detecting the presence of the submission is done over a network.

4. The method of claim 1, wherein the computing system includes an authentication system, a monitoring system, and a distribution system.

5. The method of claim 1, wherein the portion of proceeds are distributed according to an agreement between the user, an online advertisement system of computing system, and one or more websites.

6. The method of claim 1, wherein the submission is selected from the group consisting of: a literary work, a musical work, portrait image, property image, a dramatic work, a pictorial work, a graphic work, a motion picture, an audio visual work, a sound recording, an article, a text-based work, a derivative work, a compilation, and a digital image.

7. The method of claim 1, further comprising:
creating, by the processor, the user account;
presenting, by the processor, the user with an agreement;
notifying, by the processor, the user of the presence; and
transmitting, by the processor, a legal notice if the unauthorized presence of the submission is not removed.

8. The method of claim 1, further comprising:
storing, by the processor, payment information on the computer-readable storage medium;
detecting, by the processor, the one or more online advertisements at a location over a network;
determining, by the processor, the portion of the proceeds deposited into the user account; and
generating, by the processor, a time stamp to record at least one of a time and date when the submission was received by the processor executing the authentication system.

9. A computer program product, comprising a non-transitory computer readable storage device storing a computer readable program code, said computer readable program code comprising an algorithm that when executed by a computer processor of a computing system implements a method comprising:
receiving, by a processor of a computing system, a submission from a user;
authenticating, by the processor, the submission received from the user with a unique identifier of the submission;
detecting, by the processor, a presence of the submission on a website, by tracking the unique identifier on a network;
determining, by the processor, that the presence of the submission on the website is authorized;
detecting, by the processor, a presence of one or more online advertisements on the website; and
distributing, by the processor, a portion of proceeds based on the presence of the one or more online advertisements on the website into a user account associated with the submission that is present on the website.

10. The computer program product of claim 9, wherein the user is at least one of the author, the owner of the submission, and a person claiming to be the owner of the submission, who obtains proper authentication.

11. The computer program product of claim 9, wherein detecting the presence of the submission is done over a network.

12. The method of claim 9, wherein the computing systems includes an authentication system, a monitoring system, and a distribution system.

13. The computer program product of claim 9, wherein the portion of proceeds are distributed according to an agreement between the user, an online advertisement system of computing system, and one or more websites.

14. The computer program product of claim 9, wherein the submission is selected from the group consisting of: a literary work, a musical work, a dramatic work, a pictorial work, a graphic work, a motion picture, a portrait image, a property image, an audio visual work, a sound recording, an article, a text-based work, a derivative work, a compilation, and a digital image.

15. The computer program product of claim 9, further comprising:
creating, by the processor, the user account;
presenting, by the processor, the user with an agreement;
notifying, by the processor, the user of the presence; and
transmitting, by the processor, a legal notice if the unauthorized presence of the submission is not removed.

16. The computer program product of claim 9, further comprising:
storing, by the processor, payment information on the computer-readable storage medium;
detecting, by the processor, the one or more online advertisements at a location over a network;
determining, by the processor, the portion of the proceeds deposited into the user account; and
generating, by the processor, a time stamp to record at least one of a time and date when the submission was received by the processor executing the authentication system.

17. A computing system comprising a computer processor coupled to a computer-readable storage device, said storage device containing instructions that when executed by the processor implements a monitoring and distribution method comprising:
receiving, by a processor of a computing system, a submission from a user;
authenticating, by the processor, the submission received from the user with a unique identifier of the submission;
detecting, by the processor, a presence of the submission on a website, by tracking the unique identifier on a network;
determining, by the processor, that the presence of the submission on the website is authorized;
detecting, by the processor, a presence of one or more online advertisements on the website; and
distributing, by the processor, a portion of proceeds based on the presence of the one or more online advertisements on the website into a user account associated with the submission that is present on the website.

18. The computing system of claim 17, wherein the user is at least one of the author, the owner of the submission, and a person claiming to be the owner of the submission, who obtains proper authentication.

19. The computing system of claim 17, wherein detecting the presence of the submission is done over a network.

20. The method of claim 17, wherein the computing systems includes an authentication system, a monitoring system, and a distribution system.

21. The computing system of claim 17, wherein the portion of proceeds are distributed according to an agreement between the user, an online advertisement system of computing system, and one or more websites.

22. The computing system of claim 17, wherein the submission is selected from the group consisting of: a literary work, a musical work, a dramatic work, a pictorial work, a graphic work, a motion picture, an audio visual work, a portrait image, a property image, a sound recording, an article, a text-based work, a derivative work, a compilation, and a digital image.

23. The computing system of claim 17, further comprising:
creating, by the processor, the user account;
presenting, by the processor, the user with an agreement;
notifying, by the processor, the user of the presence;
transmitting, by the processor, a legal notice if the unauthorized presence of the submission is not removed;
storing, by the processor, payment information on the computer-readable storage medium;
detecting, by the processor, the one or more online advertisements at a location over a network;
determining, by the processor, the portion of the proceeds deposited into the user account; and
generating, by the processor, a time stamp to record at least one of a time and date when the submission was received by the processor executing the authentication system.

* * * * *